No. 623,149. Patented Apr. 18, 1899.
H. C. HART.
MOTOR ROAD VEHICLE.
(Application filed June 11, 1896.)
(No Model.) 2 Sheets—Sheet 1.

Witnesses.
Amelia J. Williams
Cyrus C. Lothrop

Inventor.
Henry C. Hart
per Geo. H. Lothrop
Attorney.

No. 623,149. Patented Apr. 18, 1899.
H. C. HART.
MOTOR ROAD VEHICLE.
(Application filed June 11, 1896.)
(No Model.) 2 Sheets—Sheet 2.

Witnesses.
Inventor.
Henry C. Hart
per Geo H Lothrop
Attorney.

UNITED STATES PATENT OFFICE.

HENRY C. HART, OF DETROIT, MICHIGAN.

MOTOR ROAD-VEHICLE.

SPECIFICATION forming part of Letters Patent No. 623,149, dated April 18, 1899.

Application filed June 11, 1896. Serial No. 595,192. (No model.)

*To all whom it may concern:*

Be it known that I, HENRY C. HART, of Detroit, in the county of Wayne and State of Michigan, have invented a new and useful Improvement in Motor Road-Vehicles, of which the following is a specification.

My invention relates to vehicles which are propelled by the exertion of the rider and of which the bicycle is a type.

Vehicles of the kind to which my invention especially pertains are used upon common roads, and to adapt them to such service their mechanism should be simple and light and the motion of such vehicles should answer promptly and proportionally to the governing action of the operator, which should be intuitive.

The chief objects of my invention are to provide a motor-vehicle in which the energy of the operator in working a pump or forcing apparatus to supply varying quantities of explosive mixture to an explosive-engine is proportionately multiplied to secure the propulsion and control of the vehicle and to provide a wheeled vehicle with means whereby the exertions of the operator are multiplied and the resultant power utilized in the propulsion of the vehicle, whereby the latter is propelled and controlled intuitively by the operator.

Figure 1:
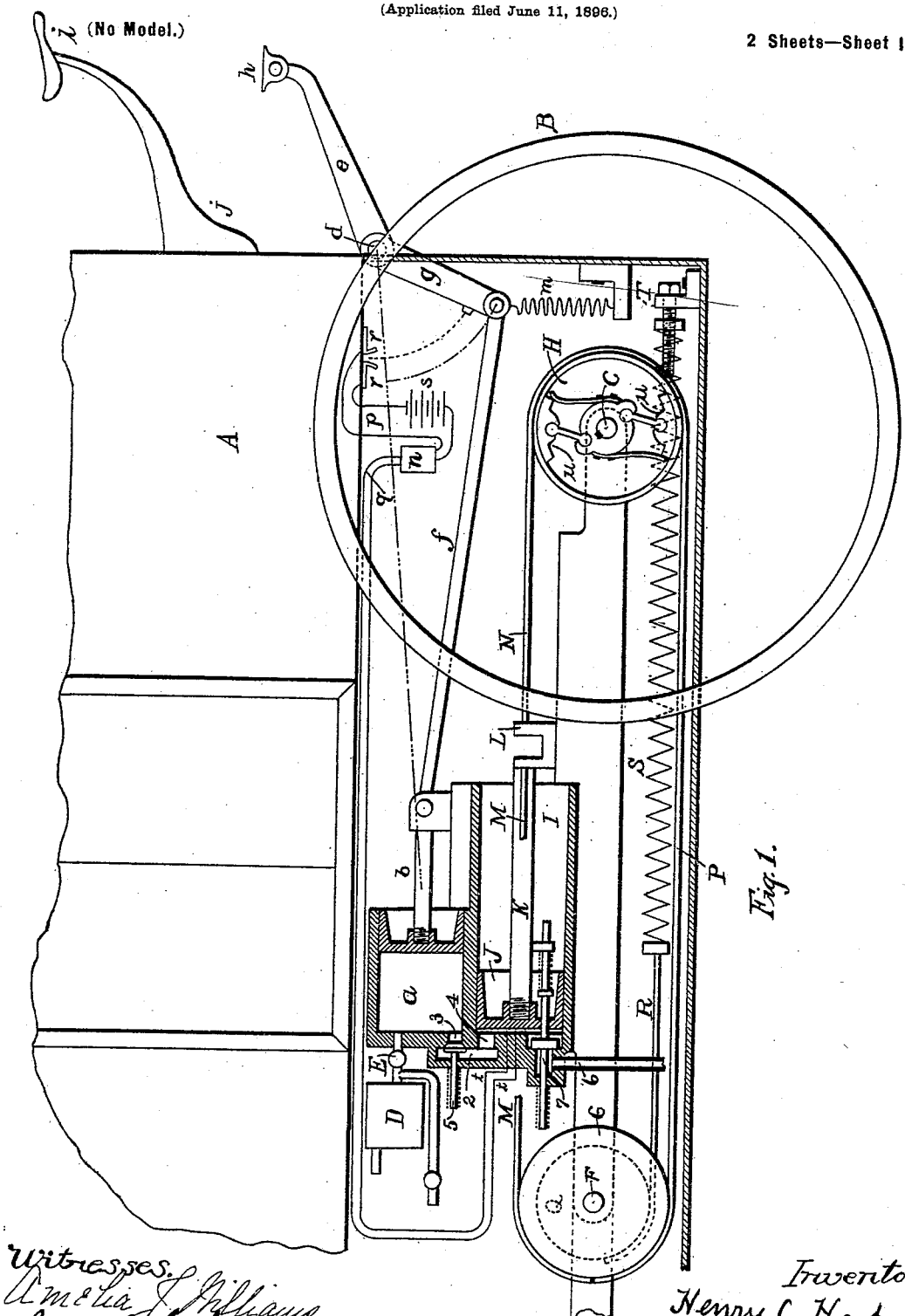
Figure 2:
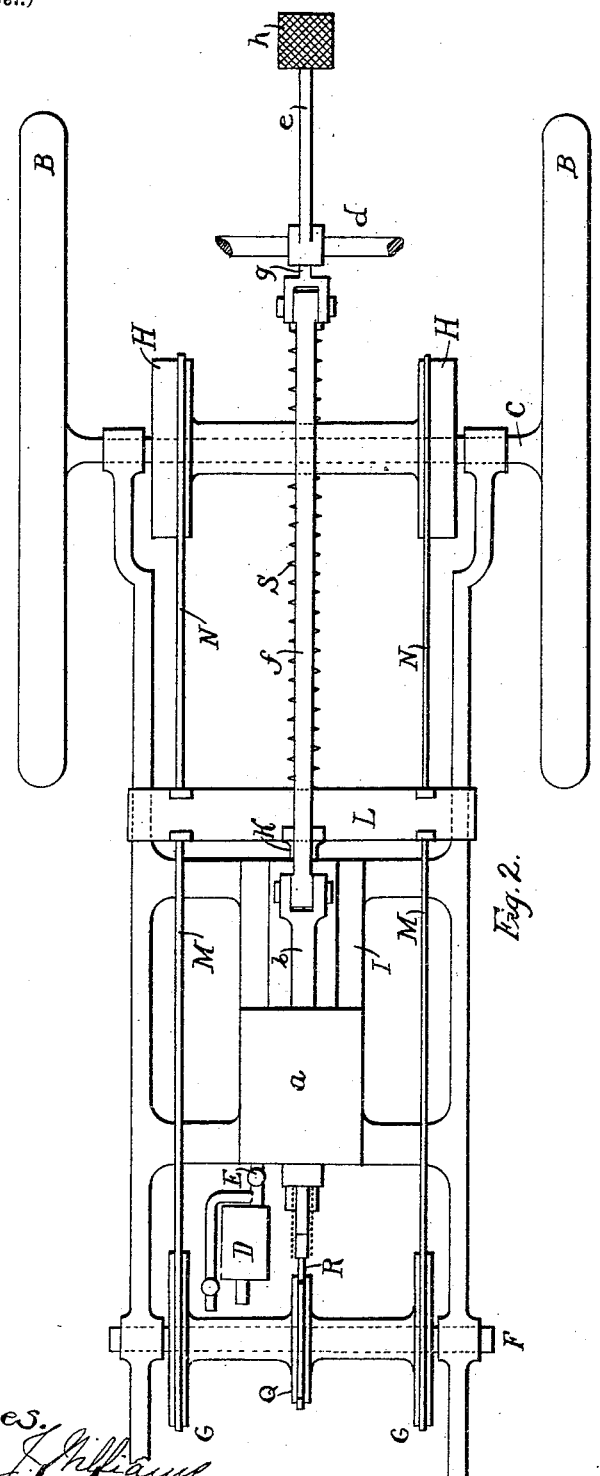

Figure 1 is an elevation, partly in section, of a vehicle and motor embodying my invention; and Fig. 2 is a plan view of the motor.

A is the body, B is a back wheel, and C the rear axle, of a road-vehicle.

F is an auxiliary shaft fixed in the frame of the vehicle parallel to the shaft C.

G is a pulley upon the shaft F, and H is a pulley upon the axle C.

I is a cylinder fixed upon the frame of the vehicle, having its axis in a horizontal plane, with a line between the tops of the pulleys G H.

J is a piston in the cylinder I.

K is a piston-rod extending from the piston J, and L is a cross-head upon the piston-rod K.

M is a rope secured at one end to the cross-head L, extending around the pulley G and having its other end secured to said pulley.

N is a rope secured at one end to the cross-head L and at the other end to the periphery of the pulley H.

P is a rope secured to the pulley G, at the periphery thereof, extending backward and around the pulley H, to which last-named pulley it is also secured.

Q is a pulley upon the shaft F.

R is a rope secured at the periphery of the pulley Q.

S is a spring secured at one end to the rope R and at the other end to a lug T upon the frame of the vehicle.

U are clutches secured to the axle and adapted to act upon a drum forming a part of the pulley H, so as to allow said pulley to turn freely in the direction of the hands of a watch and to prevent any movement of said pulley independent of said axle in the other direction.

The position of the ropes relative to the pulleys is described above in the position they would occupy when the piston J is at the closed end of the cylinder I.

The pulleys and ropes above described should preferably be in duplicate, except those connected with the spring S, one set at each side of the cylinder I, in order that the parts may move without cramping.

*a* is the cylinder of a pump or forcing apparatus, adapted to compress and force an explosive mixture of air and gas or vapor into the cylinder I behind the piston J.

*b* is the piston-rod of the pump *a*.

*d* is a rocker-shaft, and *e g* is a bell-crank lever upon the rocker-shaft *d*.

*m* is a spring adapted to draw the lever-arm *g* down to retract the pump-piston.

*f* is a connecting-rod pivoted at one end to the piston-rod *b* and at the other end to the end of the arm *g* of the bell-crank lever.

*h* is a pedal upon the end of the arm *e* of the bell-crank lever *e g*.

*i* is a seat secured to the body A by a bracket *j*.

*n* is a Ruhmkorff coil. *p* is the primary circuit, and *q* the secondary circuit, of said coil.

*s* is a source of electricity.

The primary circuit *p* is broken at *r r*, and these points are so arranged that when the lever-arm *g* rises high enough it shall form a cross between said points and complete the primary circuit.

The wires of the secondary circuit are extended into the rear end of the cylinder I and are so arranged in juxtaposition to each other that when the primary circuit $p$ is complete a spark will be formed and spring from the extremity of one wire to the other within the cylinder to ignite the charge.

D is a carbureter, and E is the inlet-passage to the pump $a$.

2 is a passage between the exit-port 3 of the cylinder $a$ and the inlet-port 4 of the cylinder I.

5 is a puppet-valve adapted to close the passage between the cylinders I and $a$.

6 is the exhaust-passage from the cylinder I.

7 is the exhaust-valve. Various forms of exhaust-valves may be used. As the particular form of valve forms no part of my present invention I do not here particularly describe it.

The operation of the above-described vehicle is as follows: The operator sits upon the seat $i$ and places his foot upon the pedal $h$. As the pedal $h$ is raised a supply of explosive mixture is drawn into the pump-cylinder from the atmosphere and carbureter D. As said pedal is depressed the explosive mixture in the pump-cylinder is compressed and forced into the cylinder I behind the piston J, where it is exploded by an electric spark or in any convenient manner, driving the piston forward against the resistance of the spring S and turning the pulleys G and H. At the outer end of the stroke of the piston J the exhaust-valve in the cylinder I is opened and the spring S draws the piston J back, turning the pulleys G H and by means of the pulley H and clutches U turning the shaft E and wheel C, thus driving the vehicle forward. At this end of its return stroke the piston comes to rest and remains stationary until the operator forces a fresh charge of explosive mixture into the cylinder.

The ignition of the charge may be effected by the movable parts of the pump completing the primary circuit of a Ruhmkorff coil, the secondary of which terminates in points in the cylinder I, or by any convenient apparatus actuated by a part of the pump or forcing apparatus, which will readily be supplied by any one familiar with the art. The ignition should of course occur after the compressed mixture has been forced into the gas-cylinder or into the chamber in which it is to be exploded, which chamber may, if desired, form a part of the pump-cylinder. The compression-stroke of the pump $a$ should occur after the piston J has returned to the closed end of the cylinder I, because if it occurs sooner the explosive mixture will simply be blown through the cylinder I and out at the exhaust-port 6. Ordinarily no pains will be required by the operator to properly time the stroke of the pump $a$, as he could scarcely act quick enough to make said stroke too soon, and moreover a little practice and judgment will enable the operator to intuitively work the pump, so that the strokes will be given at the proper times in such manner that the operator can accurately and perfectly control all the movements of the vehicle somewhat similar to the intuitive control of a bicycle by the rider.

It will be noticed that in the above device there are very few working parts and the engine is at all times directly under the control of the motorman. When he pushes down upon the pedal the engine takes a stroke. When he stops the engine stops. If he takes a long stroke he forces a large quantity of explosive mixture into the gas-cylinder and the engine takes a long stroke. If he takes a shorter stroke he forces a less quantity of explosive mixture into the gas-cylinder and the engine takes a shorter stroke. Thus the speed and power of the engine are always in proportion to the exertion of the operator.

The work done by the engine is always in ordinary practice, with the initial pressure of the charge about forty pounds, more or less, approximately a multiple (six to eight times) of the work done by the operator. Thus the operator will know intuitively the effect of any action on his part.

All the requirements to operate, govern, and regulate the above-described device are the intuitive motions of walking or bicycling as distinguished from the reasoning action of the engineer, who, for instance, operates a steam road-roller.

The initial tension of the spring S may determine the pressure to which the explosive mixture is to be compressed, inasmuch as the piston J will move forward when the pump $a$ has compressed the explosive mixture behind said piston until the tendency of said compressed mixture to move the piston J forward is greater than the pull of said spring.

Having fully described my invention, what I claim, and desire to secure by Letters Patent, is—

1. The combination with a traveling vehicle having wheels, of an engine having a piston and an explosion-chamber, a controllable pump mechanism worked by the exertions of an attendant for introducing varying quantities of explosive mixture into the explosion-chamber at will, and compressing the mixture therein, mechanism operatively connecting the engine-piston with a wheel of the vehicle, for rotating said wheel and moving the vehicle forward, and means actuated by a part of the pump mechanism for exploding the charge, whereby, at the will of the attendant, the quantity of the charge and the time of explosion can be controlled, substantially as described.

2. The combination with a wheeled vehicle, of an engine operatively connected with a wheel of the vehicle, a controllable apparatus worked by the exertions of an attendant for introducing varying quantities of explosive mixture into the engine at will and compressing the mixture therein, and means actuated by a part of said controllable apparatus for exploding the charge, whereby, at the will of the attendant, the quantity of the charge and the time of explosion can be controlled, substantially as described.

3. The combination with a wheeled vehicle, of a gas-engine having a piston in operative connection with a wheel of the vehicle, a pump operated independently of the engine and vehicle, means, substantially as described, for causing the pump to effect the working of the engine-piston, a power-spring mechanism connecting the engine-piston with the body of the vehicle, and means actuated by a part of the pump for exploding the charge, whereby, at the will of an attendant, the quantity of the charge and the time of explosion can be controlled, substantially as described.

4. The combination with a wheeled vehicle, of an engine operatively connected with a wheel of the vehicle, a controllable apparatus worked by the exertions of an attendant for introducing at will varying quantities of explosive mixture into the engine and compressing the mixture therein, a power-spring mechanism connecting a working part of the engine with the body of the vehicle, and means actuated by a part of said controllable apparatus for exploding the charge, whereby, at the will of the attendant, the quantity of the charge and time of explosion can be controlled, substantially as described.

5. The combination with a wheeled vehicle, of an explosion-engine mounted thereon, and operatively connected with a wheel of the vehicle, an apparatus independent of the explosion-engine, arranged to be worked by the exertions of the operator, for forcing the explosive mixture at will into the explosion-chamber, and means actuated by a part of such forcing apparatus, for exploding the charge, whereby, at the will of the operator, the intervals between the explosions of the charges can be controlled.

6. The combination with a traveling vehicle having wheels, of an engine having an explosion-chamber and a piston, a clutch mechanism connecting the piston with a wheel of the vehicle, a pump independent of the engine and vehicle and worked by the exertions of an attendant for introducing at will varying quantities of explosive mixture into the said explosion-chamber and compressing the same therein, means actuated by a part of said pump for exploding the charge, whereby, at the will of the attendant, the quantity of the charge and the time of explosion can be controlled, and means for utilizing the developed energy to move the wheeled vehicle forward, substantially as described.

HENRY C. HART.

Witnesses:
CYRUS E. LOTHROP,
ELLIOTT J. STODDARD.